United States Patent [19]
Goikhrakh et al.

[11] 3,861,864
[45] Jan. 21, 1975

[54] VERTICAL CONTINUOUS KILN FOR PRODUCING HIGH-PURITY METAL OXIDES AND OTHER COMPOUNDS

[76] Inventors: Aron Izrailevich Goikhrakh, Novogireevskaya ulitsa, 16, korpus 1, kv. 39; Jury Ivanovich Baikov, Artekovskaya ulitsa, 7, korpus 2, kv. 88; Ioshua Gilovich Gorshtein, Boitsovaya ulitsa, 21, kv. 27, all of Moscow, U.S.S.R.

[22] Filed: Oct. 19, 1973

[21] Appl. No.: 408,003

[52] U.S. Cl. ..................... 432/95, 432/79, 432/102
[51] Int. Cl. ............................................. F27b 1/00
[58] Field of Search ......... 432/95, 97, 79, 102, 100; 214/18 V

[56] References Cited
UNITED STATES PATENTS

| | | | |
|---|---|---|---|
| 1,992,669 | 2/1935 | Labus | 432/100 |
| 2,503,555 | 4/1950 | Lykken | 432/95 X |
| 3,071,358 | 1/1963 | Blaha | 432/95 |

*Primary Examiner*—John J. Camby
*Attorney, Agent, or Firm*—Waters, Roditi, Schwartz & Nissen

[57] ABSTRACT

A continuous vertical kiln for the production of high-purity metal oxides and other compounds comprising a vertical externally heated working chamber, a chamber for predrying starting material, said chamber being located above said working chamber and communicating therewith and means for continuous charging of material into said predrying chamber and for continuous discharge of finished products from the bottom portion of said working chamber. The means for continuous charging of material includes a paddle-type feeder with paddles arranged helically, a rotary pump whose intake communicates with the inlet of the paddle-type feeder, and whose exist communicates with the top portion of said predrying chamber and is located above the inlet of said working chamber, a grating dosing the outlet of said pump, so that the starting material is fed into the predrying chamber and therefrom- into the working chamber in cord-live form.

2 Claims, 3 Drawing Figures

VERTICAL CONTINUOUS KILN FOR PRODUCING HIGH-PURITY METAL OXIDES AND OTHER COMPOUNDS

The present invention relates to equipment for carrying out high-temperature chemical processes. More specifically, the invention has to do with vertical continuous kilns employed for the production of metal oxides and other compounds.

The herein-proposed kiln may prove to be most advantageous in the manufacture of high-purity substances and materials in which the contents of different impurities is confined to very low limits — of the order of $1.10^{-4} - 1.10^{-8}$ percent. These are, in the first place, metal oxides $Al_2O_3$, $MgO$, $SiO_2$ and others, different structural modifications of the above oxides, and oxides doped with different elements to obtain materials with the assigned specific properties which are needed for a number of branches of modern engineering — semiconductor, quantum electronics, optical engineering and others.

The manufacture of substances of so high a purity calls for the creation of conditions precluding to a maximum possible degree contamination of the substance produced with the impurities which can be introduced into it form its environment, from the kiln materials and its working members owing to abrasion and corrosion, and from heating devices or gaseous heat carriers.

At the present time the above substances are usually manufactured in well known periodic muffle or compartment type kilns, wherein are placed ceramic, quartz glass or platinum containers or crucibles filled with starting loose material which is utilized for the production of high-purity metal oxides and other compounds with the above kilns being emptied manually. The kilns require a considerable amount of containers or crucibles which fail in quantity, particularly owing to temperature changes at the kiln outlet, a feature increasing the production cost of finished products. owing to the removal of moisture and gaseous products of thermochemical dissociation the degree of filling of the containers and crucibles with the starting material does not exceed 50 percent with the volumetric efficiency of the kiln working chamber being very low and the ensuing increase in specific consumption of electric energy which may reach very large values.

The necessity for filling and emptying the containers and crucibles and for returning and introducing the emptied containers and crucibles into the kiln working chamber aggravates extremely air-tightness problems and involves manual operations which also diminishes materially both process sterility and labour productivity and does not provide stable in terms of impurity contents quality of the finished products. Usually a prolonged stay of the containers and crucibles in the kiln leads to the contamination of the substance with microimpurities introduced into it from the kiln space. The use of covers if resorted to would aggravate still more the charging and discharging operations with the containers and crucibles.

A continuous process which makes it possible to obviate manual operations and to provide adequate air-tightness allows creating most favorable conditions to eliminate contamination of the products and increase the output.

Known in the art are several modifications of continuous kilns.

Thus, tunnel kilns are provided, said kilns comprising an oblong heating horizontal working chamber with one face wall fitted with an opening and a means for charging materials to be heated and the other one with an opening and a means for discharging finished products from the kiln.

In the tunnel kilns the material is carried with the help of conveying or pushing appliances. As for loose materials they necessitate the use of containers. In the known conveyor or travelling tunnel kilns the working chamber is located above a chain conveyor which carries lined slats forming the kiln bottom. The above kiln do not provide the required isolation of the kiln working chamber from metallic elements of the conveyor which are the source of contamination due to friction and corrosion, and the kiln cannot be thereby utilized for the production of high-purity substances. In the pusher-type tunnel kilns the material is transferred either on cars or directly on the kiln bottom with the help of a pushing gear forcing each next container filled with the loose material through the working chamber of the kiln, the container in turn pushing forward other containers enclosed in the kiln and pressed against each other. Owning to the presence of the cars the above tunnel kiln suffers from the same disadvantages which are peculiar to the travelling kilns, and the containers moving directly on the kiln bottom result in the clogging of the working chamber owing to wearing away of the bottom and container materials.

Also known are walking-beam kilns wherein the material moves due to inertial forces with a reciprocating bottom plate, and those with the bottom fitted with a rocking beam, i.e. with a longitudinal beam reciprocating along the working chamber and in a vertical direction. These kilns similiarly to the walking-beam kilns are mainly suitable for processing block materials and are hardly applicable to operation with the materials to be enclosed in the containers owing to comparatively low strength of ceramic or glass from which the containers are manufactured and on account of the other disclosed hereinbefore disadvantages concerned in the use of containers.

As for loose materials, continuous rotary kilns have found wide application, with the so-called rotary drum-type kilns used in two different versions — with internal heating with flue gases or some other combustible gases, and with external heating of the working chamber. In the above kilns the working chamber is a horizontal cylinders-shaped oblong drum rotating in roller supports or bearings about its longitudinal axis. The starting material fed along a sloped pipe into the central portion of the front wall of the rotary drum proceeds therein owing to a slight inclination of the drum or due to helical finning provided on the internal surface of the drum. The finished products are discharged from the drum through a stationary hopper.

According to the second version of the kiln, the rotary drum is enclosed in a lined chamber wherein electric heaters or those for heating with combustible gases are arranged.

However the above kilns are also not capable of producing high-purity substances because commonly the internal heating does not provide the requisite purity and chemical composition of the finished products, and the problems of reliable drum lining precluding contamination of material and that of providing solid sufficiently strong rotary drums made from heat-resistant and chemically inert materials to be operated at high temperatures have not yet been solved. With external heating the temperature within the working chambers does not exceed 900°C owing to limited thermostability of the metallic lining, the above-specified temperature being insufficient.

More sterile conditions could have been obtained in a continuous vertical kiln comprising a working chamber heated by an external source, a means for continuous charging of the starting loose material into the top portion of the working chamber, and that for continuous discharge of finished products from the bottom portion of the chamber which would ensure gravity transportation of the material being heated. However the known vertical kiln is also unsuitable for the production of high-purity metal oxides and other compounds, insofar as the above substances are the result of a thermochemical process which is accompanied by the generation of gaseous dissociation products, and the starting loose material proceeding through the working chamber in a dispersed layer does not allow discharging the gaseous products which leads to a rise in gas pressure within the layer, product ejection and to the disturbance of the production process.

Hence, all the prior-art continuous kilns for proceessing loose materials do not provide the manufacture of high-purity metal oxides featuring requisite degree of purity.

An object of the invention is the provision of a vertical continuous kiln which would permit a reliable and uninterrupted thermochemical process to be carried out therein with unimpeded liberation of gaseous reaction products, which would make it possible to use the kiln for the production of high-purity metal oxides and other compounds.

Another object of the present invention is to provide a vertical kiln which would allow adjusting its efficiency.

Said and other objects are achieved in a vertical continuous kiln comprising a working chamber heated externally, a means for continuous charging of materials into the top portion of the working chamber, and that for continuous discharge of finished products from the bottom portion of the working chamber wherein, according to the invention, is arranged a chamber for preliminary drying of the starting material, the chamber being in communication with the working chamber and located above its top portion, and the means for continuous charging of materials includes a paddle-type feeder with paddles located along a helix and a rotary pump positioned in succession in the direction of motion of material with the pump outlet being closed with a grating built into the top wall of the predrying chamber owing to which the starting material is admitted first into the predrying chamber and then into the working chamber in a cord-like form.

It is expedient that the means for continuous discharge of the finished products constitute a screw conveyor whose axis is almost square with the vertical axis of the working chamber and which is fitted with a variable-speed drive.

In the herein-proposed kiln the material passes into the working chamber in the form of cords and proceeds through it in a friable layer which enables thermochemical reactions to be performed therein with the reliable removal of dissociation products and with a continuous flow of material through the working chamber. On this account the continuous high-temperature process can be carried out without resorting to manual labour under hermetic conditions at all its stages which provides for high purity and stable quality of the finished product.

With the use of the proposed kiln cleanliness of the premises is highly improved which contributes to a higher degree of purification of other substances produced therein or at other stages of the process — the production of hydroxides, filtering and other processes.

The above-described kiln is highly efficient, reliable and allow high productivity.

The invention is further exemplified by a detailed description of a specific embodiment thereof, to be had in conjunction with the accompanying drawings, wherein.

Figure 1:
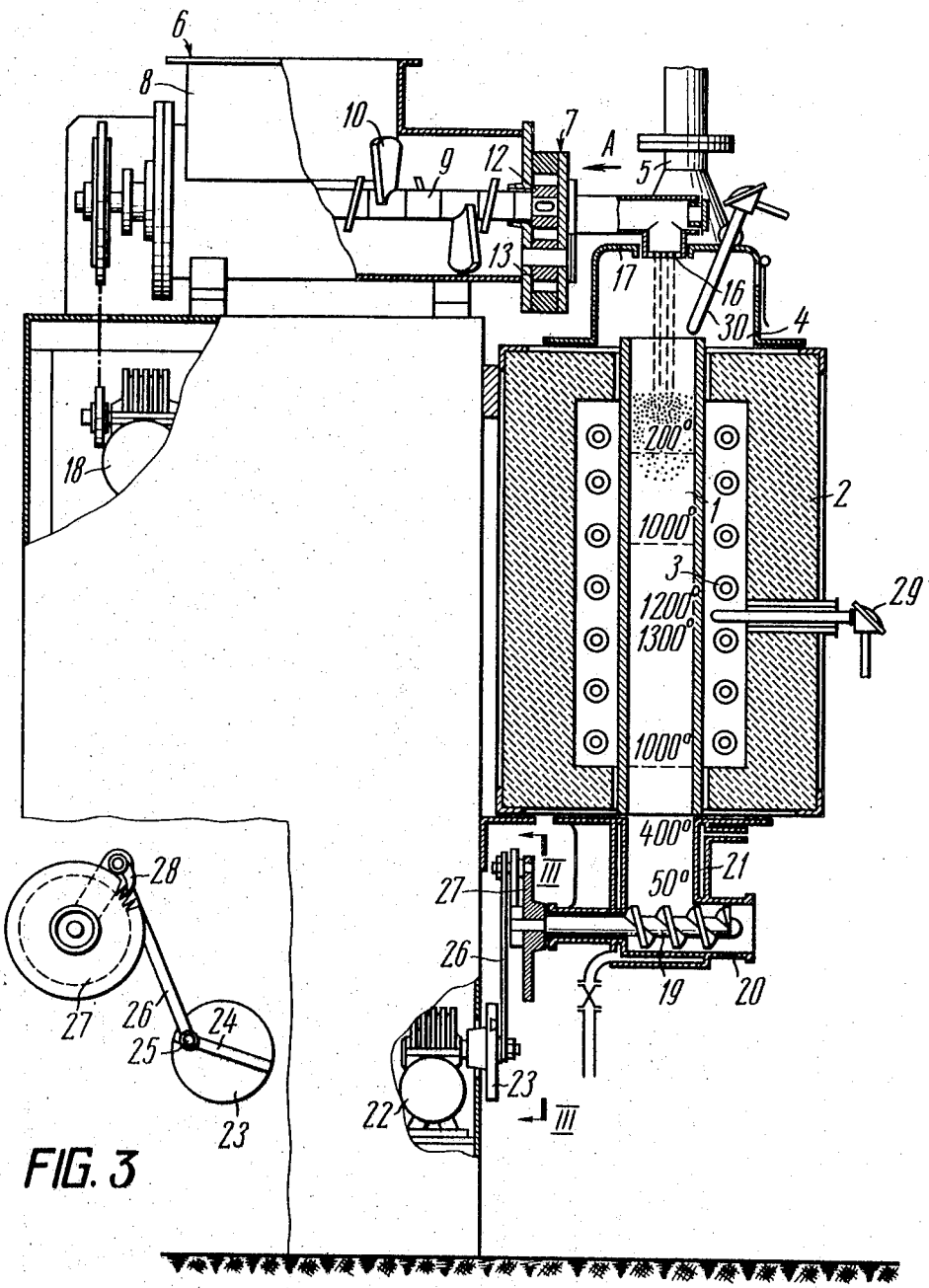
FIG. 1 is a layout of the vertical continuous kiln with a fragmentary longitudinal section, according to the invention.

FIG. 3 — is a section taken along III—III in FIG. 1.

The proposed vertical continuous kiln comprises a vertical cylinder-shaped working chamber 1 (FIG. 1) made from heat-resistant material and accommodated in a rectangular case 2 lined with refractory materials and incorporating Silit or some other electrical heaters 3. Arranged above the top portion of the working chamber 1 is a chamber 4 for preliminary drying of the material being processed, said chamber 4 being in communication with the working chamber 1. The chamber 4 is fitted with a branch pipe 5 for removing volatile products of the production process.

Figure 2:
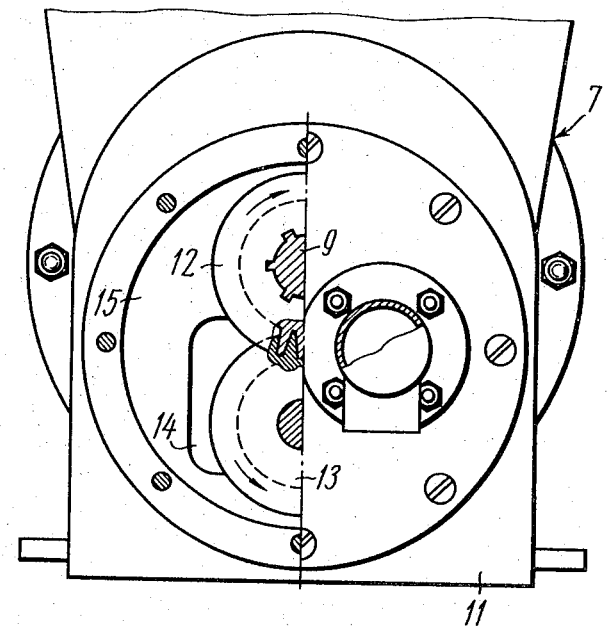
FIG. 2 is a view along arrow A in FIG. 1 showing the rotary pump with a fragmentary cutaway.

The kiln is furnished with a means for continuous feeding of starting material into the chamber 4, said means comprising a paddle-type feeder 6 and a rotary pump 7 arranged in succession in the direction of motion of the material. The paddle-type feeder 6 includes a housing 8 incorporating a horizontal shaft 9 with helically mounted paddles 10. The rotary pump 7 comprises a body 11 ((FIG. 2) incorporating a driving wheel 12 and a drive wheel 13 with the driving wheel 12 being mounted on the shaft 9 of the paddle-type feeder 6 (FIG. 1). An intake 14 (FIG. 2) is located in the front wall of the body 11 to connect a suction space 15 of the pump 7 to the paddle-type feeder 6 (FIG. 1). A discharge opening of the pump 7 is closed with a grating 16 built into the top wall 17 of the predrying chamber 4.

Both the paddle-type feeder 6 and pump 7 are brought into rotation by a drive 18.

The kiln comprises also a means for continuous discharge of the finished products from the bottom portion of the working chamber 1, said means constituting a screw conveyor 19 whose axis is almost square with the vertical axis of the working chamber 1 and whose end enters a discharging branch pipe 20 of the working chamber 1. In the bottom portion of the working chamber 1 provision is made for a cooling jacket 21 to cool down the finished products being discharged. The screw conveyor 19 is brought into rotation by a variable-speed drive comprising an electric motor 22 connected to the screw conveyor 19 through a gear which is adapted to vary the speed of rotation of the screw conveyor 19 and consists of a crank disc 23 with a slot 24 wherein transfers a crank pin 25 (FIG. 3), of a connecting rod 26, a ratchet wheel 27 and a pawl 28.

The temperature within the working chamber 1 (FIG. 1) is measured by thermocouples 29.

As to the level of material in the working chamber 1, it is measured by a level gauge 30.

The continuous vertical kiln disclosed hereinbefore operates in the following manner.

Upon filtering, centrifuging or upon being processed in some other apparatus, the starting material in the form of paste is continuously or intermittently charged into the paddle-type feeder 6 whose rotating paddles 10 carry the material to the pump 7. The latter draws in the material through the intake 14 (FIG. 2) and forces (extrudes) it through the openings in the grating 16 (FIG. 1). The extruded cord-like material passes through the predrying chamber 4 into the working chamber 1 forming a friable mass through which water vapors and gases liberated during the high-temperature processes of dissociation and formation of the finished products can pass readily, a feature which precludes a rise in pressure within the layer and product ejection from the kiln.

The requisite temperature in the working chamber 1 is obtained with the aid of electrical heaters 3 whose voltage is adjusted by an auto-type transformer (not shown in the drawing).

Temperature conditions are maintained automatically with the help of thermocouples 29 and electric devices (not shown in the drawing) to satisfy the production process requirements. As the material descends approaching the exit from the working chamber 1, the formation of the finished products of the requisite composition and structure and the removal of gaseous substances therefrom come also to an end.

In the bottom portion of the working chamber 1 the product is cooled to a temperature of 30° – 50° with the aid of the water jacket 21, the drop in temperature being necessary to enable immediate packing of the finished product and to produce the screw conveyor 19 from appropriate materials featuring small heat resistance.

The finished product is discharged by the screw conveyor 19 through the branch pipe 20 with the tare being connected thereto without impairing airtightness. The speed of rotation of the screw conveyor 19 is adjustable within the ranges required to adjust the furnace efficiency to provide its optimum value in full accordance with the production cycle. The speed of the screw conveyor 19 is changed by setting the crank pin 25 (FIG. 3) to a new position in the slot 24 of the crank disc 23 and securing it therein, this resulting in a change in the number of teeth of the ratchet wheel 27 passed by the pawl 28, and in an appropriate change in the deflection angle of the screw conveyor 19 (FIG. 1) with the ensuing variation of the intermittent rotation of the screw conveyor 19.

The level of material in the working chamber 1 of the kiln is maintained at a preset value with the help of the level gauge 30 and known electronic devices (not shown in the drawing) engaging or disengaging the drive 18 as soon as a minimum or a maximum level of material is attained.

What we claim is:

1. A continuous vertical kiln for the production of high-purity metal oxides and other compounds, comprising a vertical working chamber; a chamber for predrying starting material, said predrying chamber being located above said working chamber and in communication with the latter; heaters located externally of said working chamber, said heaters heating said predrying chamber; means for continuous charging of material into said predrying chamber; a paddle-type feeder connected to said continuous charging means, said paddle-type feeder having helically located paddles; a rotary pump communicating with said continuous charging means having a pump intake communicating with an outlet of said paddle-type feeder and a pump outlet communicating with the top portion of said predrying chamber and being located above the inlet of said working chamber; a grating closing the outlet of said pump through which the starting material is fed into said predrying chamber to be predried therein and being subsequently conveyed into said working chamber in a cord-like form; and means for continuous discharge of said finished cord-like products from the bottom portion of said working chamber.

2. A vertical kiln as in claim 1, said means for continuous discharge of finished products from said working chamber comprising a screw conveyor having an axis substantially normal to the vertical axis of said working chamber, and a variable-speed drive connected to said screw conveyor for imparting rotation thereto.

* * * * *